(12) United States Patent
Rai et al.

(10) Patent No.: US 7,519,234 B2
(45) Date of Patent: Apr. 14, 2009

(54) APPARATUSES AND METHODS FOR INCORPORATING A BORDER REGION WITHIN AN IMAGE REGION

(75) Inventors: Barinder Singh Rai, Surrey (CA); Jiliang Song, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 745 days.

(21) Appl. No.: 10/991,264

(22) Filed: Nov. 17, 2004

(65) Prior Publication Data

US 2006/0104534 A1    May 18, 2006

(51) Int. Cl.
*G06K 9/36* (2006.01)
(52) U.S. Cl. ........................ 382/291; 382/164; 382/167; 382/266; 382/278
(58) Field of Classification Search .................. 382/266, 382/269, 282, 291
See application file for complete search history.

(56) References Cited

U.S. PATENT DOCUMENTS

| | | | |
|---|---|---|---|
| 4,555,802 A | 11/1985 | Fedak et al. | |
| 4,646,356 A | 2/1987 | Anderson et al. | |
| 4,698,666 A | 10/1987 | Lake, Jr. et al. | |
| 5,131,080 A | 7/1992 | Fredrickson et al. | |
| 5,363,174 A * | 11/1994 | Magde et al. ................. 399/49 |
| 5,375,198 A * | 12/1994 | Guttag et al. ............... 715/806 |
| 5,410,415 A | 4/1995 | Parulski et al. | |
| 5,455,870 A * | 10/1995 | Sepai et al. .................. 382/147 |
| 5,512,921 A | 4/1996 | Mital et al. | |
| 5,600,412 A | 2/1997 | Connors | |
| 5,668,940 A * | 9/1997 | Steiner et al. ................ 345/592 |
| 5,831,747 A | 11/1998 | Salgado | |
| 5,835,082 A | 11/1998 | Perego | |
| 6,097,364 A | 8/2000 | Miyamoto et al. | |
| 6,141,459 A | 10/2000 | Gendel | |
| 6,195,078 B1 | 2/2001 | Dinwiddie et al. | |
| 6,236,392 B1 * | 5/2001 | Inamori ....................... 345/204 |
| 6,356,300 B1 * | 3/2002 | Shiba .......................... 348/130 |
| 6,359,625 B1 | 3/2002 | Perego | |
| 6,370,279 B1 * | 4/2002 | Paik ........................... 382/268 |
| 6,421,054 B1 * | 7/2002 | Hill et al. ..................... 345/469 |
| 6,590,573 B1 | 7/2003 | Geshwind | |
| 6,636,633 B2 * | 10/2003 | Guo ............................ 382/199 |
| 6,744,532 B1 * | 6/2004 | Chen ........................... 358/1.9 |
| 6,873,310 B2 * | 3/2005 | Matsueda ..................... 345/77 |
| 7,276,914 B2 * | 10/2007 | Li ................................ 324/534 |

FOREIGN PATENT DOCUMENTS

| | | |
|---|---|---|
| JP | 4-182822 | 6/1992 |
| JP | 6-106810 | 4/1994 |

* cited by examiner

*Primary Examiner*—Yosef Kassa
(74) *Attorney, Agent, or Firm*—Mark P. Watson (57) ABSTRACT

A hardware implemented method for incorporating a border region within an image region is provided. In this hardware implemented method, a position of a pixel along a line within the image region is first computed. The position of the pixel is then compared with an offset value, whereby the offset value defines boundaries of the border region along the line. Thereafter, an image pixel or a color of the border region is selected for display based upon the position of the pixel relative to the offset value. An apparatus and a display controller for incorporating the border region within the image region are also described.

23 Claims, 7 Drawing Sheets

APPARATUSES AND METHODS FOR INCORPORATING A BORDER REGION WITHIN AN IMAGE REGION

CROSS REFERENCE TO RELATED APPLICATIONS

This application is related to U.S. Patent Publication No. 2002/0057265, filed on Oct. 23, 2001, entitled "Display Driver, and Display Unit and Electronic Instrument Using the Same," and is related to U.S. Patent Publication No. 2002/0018058, filed on Jul. 25, 2001, entitled "RAM-Incorporated Driver, and Display Unit and Electronic Equipment Using the Same," the disclosure of these applications are incorporated herein by reference in their entirety for all purposes.

BACKGROUND OF THE INVENTION

1. Field of the Invention

This invention relates generally to computer graphics and, more particularly, to hardware implemented methods and an apparatus for incorporating a border region within an image region.

2. Description of the Related Art

Liquid crystal display (LCD) controller designs typically use an overlay technique for applying a border to a main image. In this technique, the overlay is placed on top of the main image and the transparent bits (where the image data is shown) are specified. The memory requirements are relatively large for this technique as both the overlay image and the main image are stored in memory. Of course, the power consumption increases along with the memory requirements.

The increased memory and higher power consumption rate become a problem for certain battery operated consumer electronic devices. For example, with respect to cell phones, it is becoming commonplace to capture an image through a camera of the cell phone, place a border around the image, and transmit the image to another user. However, the traditional border generation scheme using an overlay consumes an excessive amount of memory and power for the cell phone applications. Techniques to address these shortcomings sacrifice border design choices and limit the user's ability to customize the border in order to reduce the memory requirements and power consumption.

As a result, there is a need to solve the problems of the prior art to provide a border generation scheme that reduces memory requirements and power consumption without limiting the border options available to a user.

SUMMARY OF THE INVENTION

Broadly speaking, the present invention fills these needs by providing an apparatus and hardware implemented methods for incorporating a border region within an image region. It should be appreciated that the present invention can be implemented in numerous ways, including as a method, a system, or a device. Several inventive embodiments of the present invention are described below.

In accordance with a first aspect of the present invention, a hardware implemented method for incorporating a border region within an image region is provided. In this hardware implemented method, a position of a pixel along a line within the image region is first computed. The position of the pixel is then compared with an offset value, whereby the offset value defines boundaries of the border region along the line. Thereafter, an image pixel or a color of the border region is selected for display based upon the position of the pixel relative to the offset value.

In accordance with a second aspect of the present invention, an apparatus for incorporating a border region within an image region is provided. The display controller includes circuitry for computing a position of a pixel along a line within the image region and circuitry for comparing the position of the pixel with a first offset value and a second offset value, whereby the first and second offset values define boundaries of the border region along the line. The display controller additionally includes circuitry for generating a first signal for selecting an image pixel from a memory for display if the position of the pixel is between the first and second offset values, and for generating a second signal for selecting a color of the border region for display if the position of the pixel is outside a region defined between the first and second offset values. The apparatus additionally includes a central processing unit (CPU) in communication with the display controller and a display panel in communication with the display controller that enables the display of the image region.

In accordance with a third aspect of the present invention, a display controller for incorporating a border region within an image region is provided. The display controller includes an offset table decoder that includes logic for comparing a position of a pixel with an offset value. The offset table decoder further includes logic for generating a signal to a selection circuitry to select a color of the border region for display if the position of the pixel is less than the offset value.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for hardware implemented methods and an apparatus for incorporating a border region within an image region. It will be obvious, however, to one skilled in the art, that the present invention may be practiced without some or all of these specific details. In other instances, well known process operations have not been described in detail in order not to unnecessarily obscure the present invention.

The embodiments described herein provide an apparatus, a display controller, and hardware implemented methods for incorporating a border region within an image region. Essentially, a position of a pixel along a horizontal or vertical line within the image region is computed. The position of the pixel is then compared with an offset value, whereby the offset value defines boundaries of the border region along the line. As will be explained in more detail below, an image pixel or a color of the border region is selected for display based upon the position of the pixel relative to the offset value.

Figure 1:
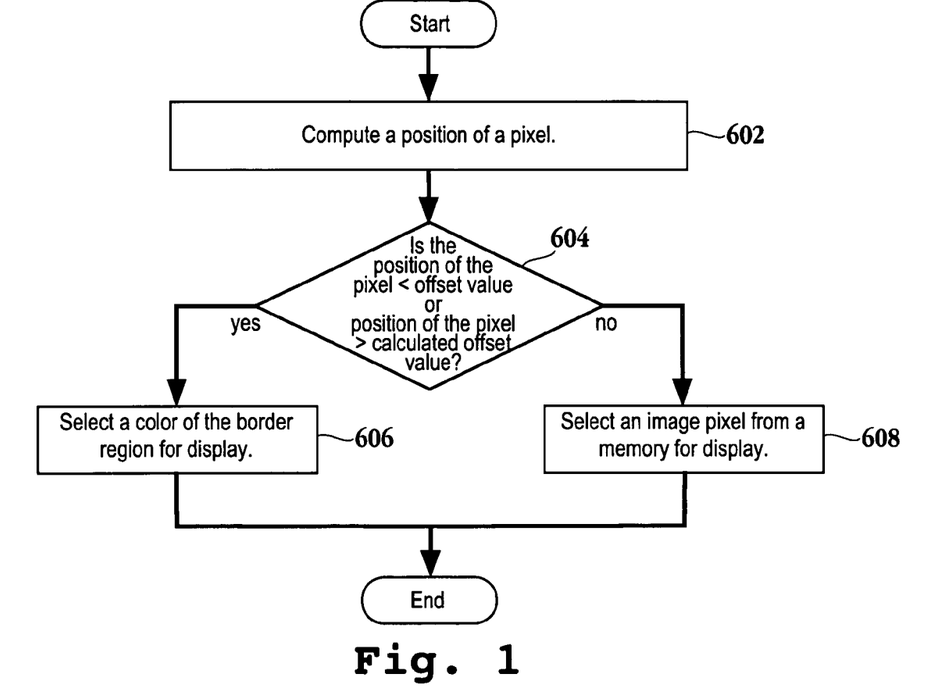
FIG. 1 is a flowchart diagram of a high level overview of a hardware implemented method for incorporating a border region within an image region, in accordance with one embodiment of the present invention.

FIG. 1 is a flowchart diagram of a high level overview of a hardware implemented method for incorporating a border region within an image region, in accordance with one embodiment of the present invention. Starting in operation 602, a position of a pixel along a line within an image region is computed. The line may be along a horizontal line or along a vertical line within the image region. As will be explained in more detail below, in one embodiment, the position of the pixel is computed by one or more counters. Subsequently, in operation 604, the position of the pixel is compared with an offset value. The offset value defines the boundaries of the border region along the line. An image pixel or a color of the border region is then selected for display based upon the position of the pixel relative to the offset value. For example, in the embodiment of FIG. 1, if the position of the pixel is less than the offset value, then a color defining a pixel of the border region is selected for display in operation 606. On the other hand, if the position of the pixel is greater than or equal to the offset value, then an image pixel is selected from a memory for display in operation 608.

As will explained in more detail below, the comparison operation described above defines the boundaries of a left side of the border region, in accordance with one embodiment of the present invention. In another embodiment, to define the boundaries of a right side of the border region, offset values that define the right side are first calculated from the above-referenced offset values. For example, the calculated offset value is defined by the offset value subtracted from a width of the image region. Accordingly, as shown in operations 604 and 606, if the position of the pixel additionally is greater than the calculated offset value, then the color defining a pixel of the border region is selected for display. Else, if the position of the pixel is less than or equal to the calculated offset value, then the image pixel is selected from the memory for display in operation 608. The above described operations repeat for a next pixel along the line, and repeat for every line within the image region to incorporate the border region within the image region.

Figure 2:
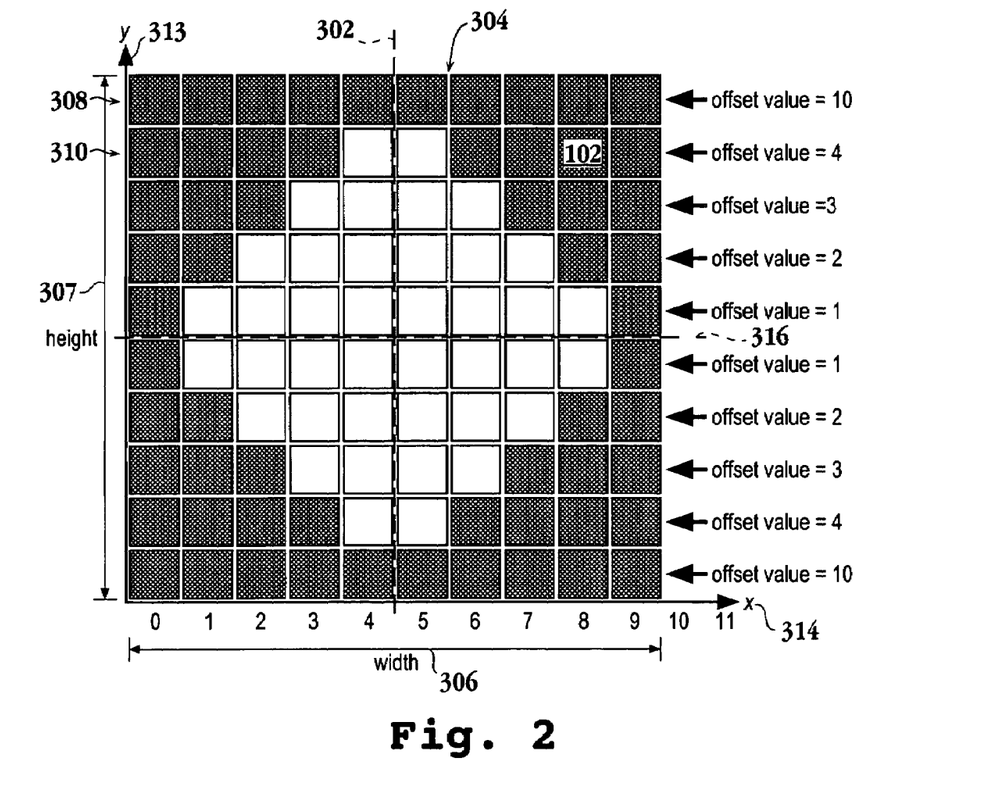
FIG. 2 is a simplified schematic diagram illustrating a symmetrical border region incorporated within an image region, in accordance with one embodiment of the present invention.

FIG. 2 is a simplified schematic diagram illustrating a symmetrical border region incorporated within an image region, in accordance with one embodiment of the present invention. As shown in FIG. 2, border region 102 is shown in black and image region 304 is defined by an image with width 306 and height 307. Border region 102 is incorporated within image region 304. In other words, the incorporation gives the appearance that border region 102 is overlaid on top of image region 304 such that portions of the image region that are not blocked by the border region are visible.

To define the boundaries of border region 102, at least one offset value is defined for each horizontal line across image region 304. In one exemplary embodiment, the operations of FIG. 1 may be applied to incorporate border region 102 within image region 304. For example, in this embodiment, along first horizontal line 308 located at the top of image region 304, an offset value of ten is defined. As discussed above, as each pixel is being output for display from left to right, the position for each pixel along first horizontal line 308 is computed. The numbers along x-axis 314 define the relative position of each pixel along the horizontal direction. For instance, a pixel at the upper left corner of image region 304 has a position of zero along the horizontal direction. Another pixel at the upper right corner of image region 304 has a position of nine along the horizontal direction. It should be appreciated that x-axis 314 may have any suitable coordinates. For example, instead of starting at zero, the x-axis may start with a value of one.

Still referring to FIG. 2, the position of each pixel is then compared with the corresponding offset value. The offset value defines the boundaries of border region 102 along a line. As discussed above, in one embodiment, if a position of the pixel is less than the offset value, then a color of border region 102 is selected for display. Otherwise, if the position of the pixel within image region 304 is greater than or equal to the offset value, then an image pixel is selected from a memory for display. As shown in FIG. 2, image region 304 includes ten horizontal lines. An offset value of ten is defined for first horizontal line 308. Since the positions of the pixels (0-9) along first horizontal line 308 are all less than the offset value of ten, then the color that defines border region 102 is selected for display for every pixel along the first horizontal line. Accordingly, border region 102 extends across the entire width 306 of image region 304 along first horizontal line 308.

However, along second horizontal line 310, border region 102 does not extend across the entire width 306. Instead, portions of border region 102 are displayed. To define the boundaries of border region 102, an offset value of four is defined for second horizontal line 310. The four left pixels have positions of 0, 1, 2, and 3 along second horizontal line 310. Since the positions of the four left pixels are all less than four, then the color that defines border region 102 is selected for display for the four left pixels. However, a fifth pixel from the left along second horizontal line 310 has a position of four and, because this position is equal to the offset value of four, then an image pixel instead is selected from the memory for display. Similarly, the sixth pixel from the left has a position of five and, because the position is greater than the offset value of four, another image pixel is selected from the memory for display.

As shown in FIG. 2, border region 102 is symmetrical with respect to both vertical axis 302 and horizontal axis 316. In particular, the symmetry along vertical axis 302 results in the left side of border region 102 being a mirror image of the right side of the border region with reference to the vertical axis. As such, offset values that define the boundaries of the right side of border region 102 (i.e., right offset values) can be derived from the offset values that define the boundaries of the left side of the border region (i.e., left offset values). In one embodiment, the right offset value is defined by the left offset value subtracted from width 306 of image region 304. In other words, $$\text{right offset value} = \text{width} - \text{left offset value}. \tag{1.1}$$

For example, second horizontal line 310 has a left offset value of four, which defines the boundary of border region 102 to the left side of vertical axis 302. To derive the right offset value that defines the boundary of border region 102 to the right side of vertical axis 302, the left offset value of four is subtracted from a width of nine. Thus, the right offset value is computed as five. Another comparison may be implemented such that if the position of the pixel to the right side of vertical axis 302 is greater than the right offset value, then the color of border region 102 is selected for display. Otherwise, if the position of the pixel to the right side of vertical axis 302 is less than or equal to the right offset value, then the image pixel is selected from memory for display.

In brief, a color of border region 102 is selected for display if the position of the pixel is between a left edge of image region 304 and the left offset value. Otherwise, the image pixel is selected from a memory for display if the position of the pixel is not between the left edge of image region 304 and a left offset value. For a symmetrical border region 102 with respect to vertical axis 302, the boundaries of the border region to the right of the vertical axis may be derived from the left offset values. Thus, in one embodiment, the color of border region 102 is selected for display if the position of the pixel is between a right edge of image region 304 and the right offset value, where the right edge is opposing the left edge. If the position of the pixel is not between the right edge of image region 304 and the right offset value, then the image pixel is selected from memory for display.

It should be appreciated that the offset values may also define boundaries of border region 102 along the vertical direction, in accordance with one embodiment of the present invention. In this embodiment, instead of referencing the left edge and the right edge of image region 304, a top edge and a bottom edge of the image region are referenced instead. As such, equation 1.1 discussed above may be rewritten as:

$$\text{top offset value} = \text{height} - \text{bottom offset value}. \quad (1.2)$$

Furthermore, the comparisons of the pixel positions as discussed above assume that the pixel positions increase from left to right along x-axis 314. However, the comparisons may be reversed if the pixel positions increase from right to left instead along x-axis 314.

Figure 3:
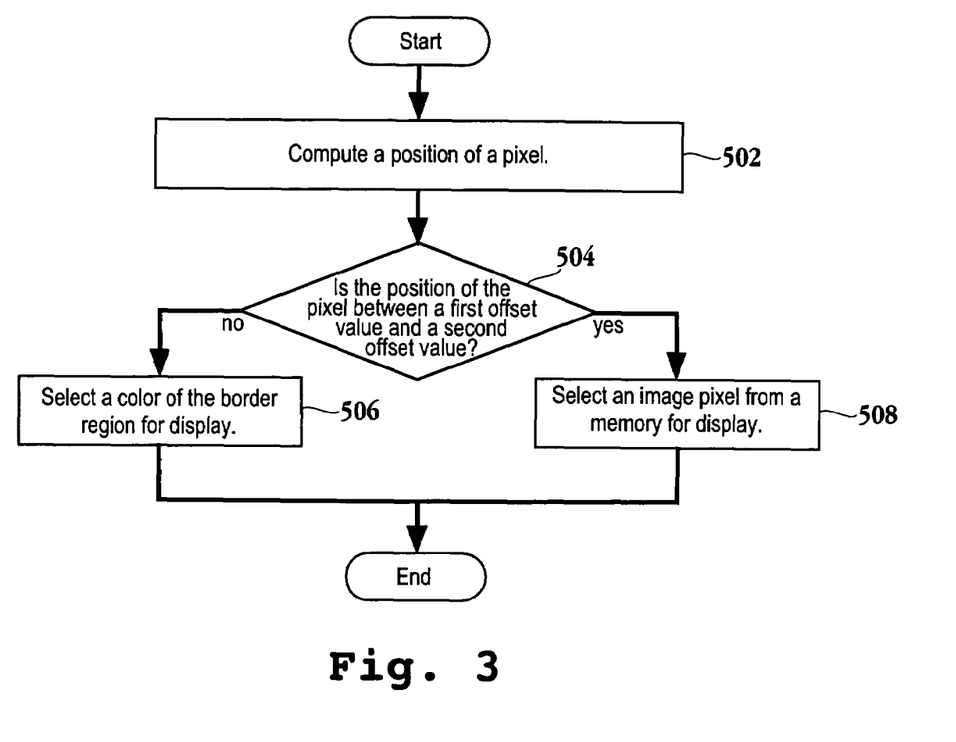
FIG. 3 is another flowchart diagram of a high level overview of a hardware implemented method for incorporating a border region within an image region, in accordance with one embodiment of the present invention.

FIG. 3 is a flowchart diagram of a high level overview of a hardware implemented method for incorporating a border region within an image region, in accordance with one embodiment of the present invention. Similar to the method operation of FIG. 1, the position of a pixel along a line within an image region is computed in operation 502. However, in this embodiment, instead of one offset value, two offset values are used for defining the boundaries of the border region along a line. Accordingly, at operation 504, the position of the pixel is compared with a first offset value and a second offset value. If the position of the pixel is between the first offset value and the second offset value, then an image pixel is fetched from a memory for display in operation 508. Otherwise, if the position of the pixel is outside a region defined between the first offset value and the second offset value, then a color of the border region is selected for display in operation 506. Furthermore, as discussed above with reference to FIG. 2, x-axis 314 and y-axis 313 may have any suitable coordinates, and the comparisons of the offset values discussed above may change relative to the utilized coordinate system. For example, in one embodiment, if x-axis 314 starts at one instead of zero, then the comparison discussed above changes to displaying a color of border region 102 for display if the position of the pixel is less than or equal to the offset value.

Figure 4:
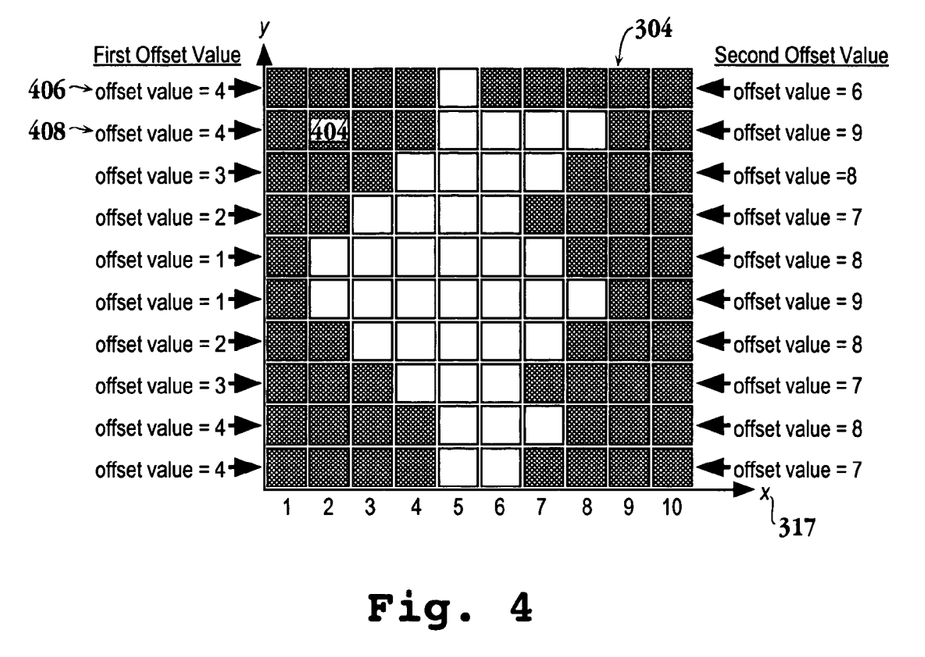
FIG. 4 is a simplified schematic diagram illustrating an asymmetrical border region incorporated within an image region, in accordance with one embodiment of the present invention.

FIG. 4 is a simplified schematic diagram illustrating an asymmetrical border region incorporated within an image region, in accordance with one embodiment of the present invention. Unlike the symmetrical border region of FIG. 2, border region 404 of FIG. 4 is asymmetrical, and unlike the x-axis of FIG. 2, x-axis 317 starts with a position of one instead of zero. In one embodiment, the operations discussed in FIG. 3 may be used to define the boundaries of border region 404. As discussed above, in one embodiment, the position of a pixel being displayed is compared with a first offset value and a second offset value. If the position of the pixel is between the first offset value and the second offset value, than an image pixel is fetched for display. Else, a color of the border region is selected for display. FIG. 4 shows two offset values for each horizontal line of image region 304. For example, along first horizontal line 406 located at the top of image region 304, a first offset value of four and a second offset value of six are defined. Therefore, for the single pixel that is between the positions of four and six, an image pixel is selected from a memory for display. However, a color of border region 404 is selected for display for the pixels that are outside a region defined between the positions of four and six.

Another example shows second horizontal line 408 located below first horizontal line 406 is defined by a first offset value of four and a second offset value of nine. Thus, image pixels are selected for display for the pixels that are between the positions of four and nine. For the pixels that are outside a region defined between the positions of four and nine, the color of border region 404 is selected for display instead. As such, the use of two offset values for each horizontal line of image region 304 allows border region 404 to have asymmetrical boundaries.

Furthermore, as shown in FIGS. 2 and 4, border regions 102 and 404 have one color, in accordance within one embodiment of the present invention. However, in another embodiment, each horizontal or vertical line of border regions 102 and 404 may have a different color. For example, in addition to having one or more offset values for each line, a color value (not shown) may additionally be assigned to each line, thereby defining a color for each line of border regions 102 and 404. Thus, instead of selecting one color for display, a different color may be selected for each line of border regions 102 and 404.

Figure 5:
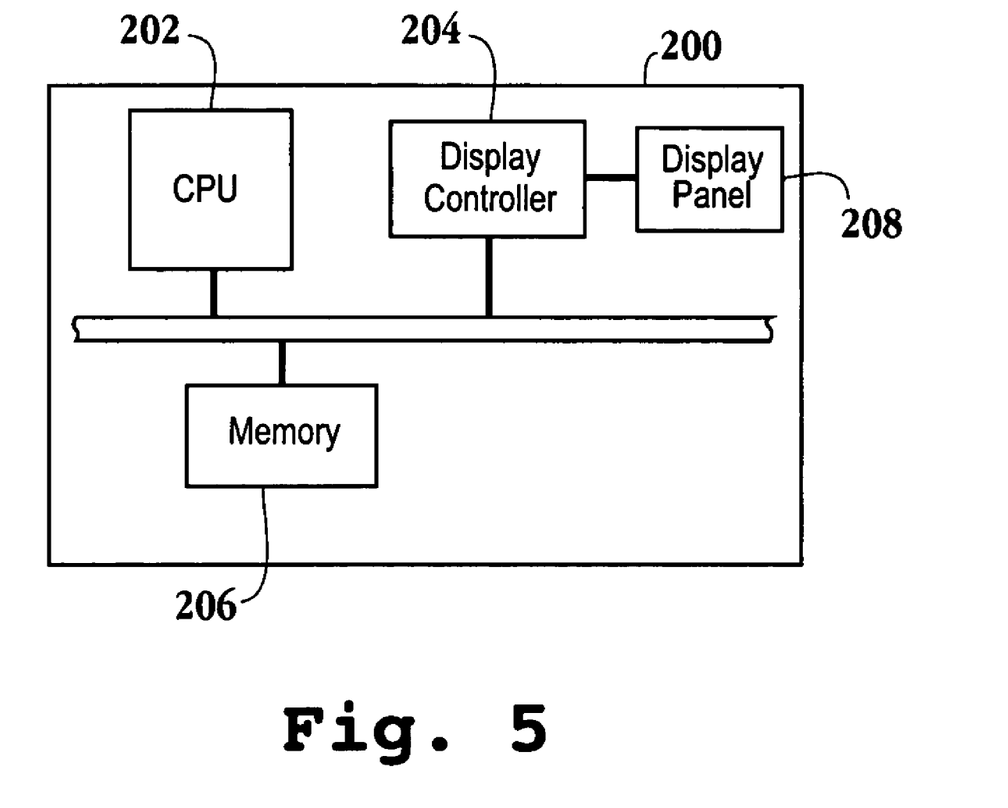
FIG. 5 is a simplified schematic diagram of an apparatus for incorporating a border region within an image region, in accordance with one embodiment of the present invention.

FIG. 5 is a simplified schematic diagram of an apparatus for incorporating a border region within an image region, in accordance with one embodiment of the present invention. Apparatus 200 includes any suitable type of computing device. For example, apparatus 200 may be a personal digital assistant, a cell phone, a web tablet, a pocket personal computer, etc. As shown in FIG. 5, apparatus 200 includes central processing unit (CPU) 202, memory 206, display controller 204, and display panel 208. Display controller 204 is in communication with CPU 202, memory 206, and display panel 208. One skilled in the art will appreciate that CPU 202, memory 206, and display controller 204 may be in communication through a common bus.

Examples of memory 206 include any suitable memory types, such as static access memory (SRAM), dynamic random access memory (DRAM), etc. In one embodiment, image pixels and offset values are stored in one or more memories included within display controller 204. In another embodiment, memory 206, which is external to display controller 204, may also be configured to store the image pixels and the offset values.

Display panel 208 may include RAM-integrated display panels, liquid crystal displays (LCD), thin-film transistor (TFT) displays, cathode ray tube (CRT) monitors, televisions, etc. One skilled in the art will appreciate that RAM-integrated display panels include integrated chip display drivers with built-in random access memory (RAM) that drives a display section based on still-display data and moving-display data. In effect, the image pixels may be temporarily stored in the built-in RAM. For more information on RAM-integrated panels, reference may be made to U.S. patent publication No. 2002/0057265, entitled "Display Driver, and Display Unit and Electronic Instrument Using the Same," and to U.S. patent publication No. 2002/0018058, entitled "RAM-Incorporated Driver, and Display Unit and Electronic Equipment Using the Same," and which are herein incorporated by reference.

The functionality described above for incorporating a border region within an image region may be incorporated into display controller 204. In one embodiment, as will be explained in more detail below, display controller 204 includes circuitry for computing a position of a pixel along a line within the image region. Additionally, circuitry for comparing the position of the pixel with a first offset value and a second offset value is also included. If the position of the pixel is between the first offset value and the second offset value, display controller 204 includes circuitry for generating a first signal for selecting an image pixel from a memory for display. Otherwise, if the position of the pixel is outside a region defined between the first offset value and the second offset value, then a second signal is generated for selecting a color of the border region for display.

Figure 6:
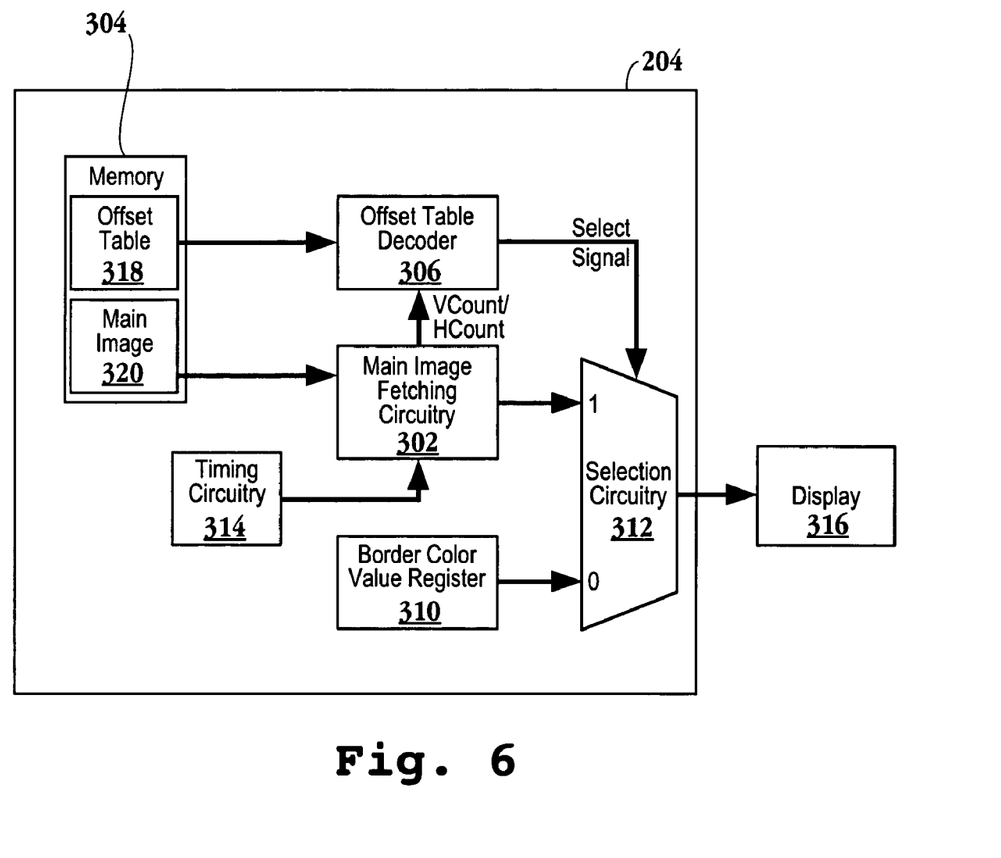
FIG. 6 is a more detailed schematic diagram of the display controller shown in FIG. 5, in accordance with one embodiment of the present invention.

FIG. 6 is a more detailed schematic diagram of display controller 204 shown in FIG. 5, in accordance with one embodiment of the present invention. As shown in FIG. 6, display controller 204 includes memory 304, offset table decoder 306, main image fetching circuitry 302, selection circuitry 312, border color value register 310, and timing circuitry 314. Main image fetching circuitry 302, which is in communication with memory 304, selection circuitry 312 (e.g., a multiplexer), timing circuitry 314, and offset table decoder 306, fetches the stored image pixels from memory 304. Memory 304 included within display controller 204 is configured to store image pixels in main image block 320 and store offset values in offset table 318. The size of offset table 318 depends on the size of display 316. For example, with a symmetrical border region, the number of offset values in offset table 318 is equal to a height of display 316. With an asymmetrical border region, the number of offset values in offset table 318 is equal to double the height of display 316. Further, a width of display 316 determines the size of each offset value stored within offset table 318. For example, if display 316 is ten bits wide, then the size of each offset value is four bits. The size of offset table 318 is the size of each offset value multiplied by the number of offset values. In addition to storing offset values, offset table 318 may additionally store color values for each line of the border region, in accordance with one embodiment of the present invention.

It will be apparent to one skilled in the art that the functionality described herein may be synthesized into firmware through a suitable hardware description language (HDL). For example, the HDL, e.g., VERILOG, may be employed to synthesize the firmware and the layout of the logic gates for providing the necessary functionality described herein to provide a hardware implementation of the border region incorporation techniques and associated functionalities. Thus, the embodiments described herein may be captured in any suitable form or format that accomplishes the functionality described herein and is not limited to a particular form or format. For example, in one embodiment, offset table decoder 306 includes the logic and/or circuitry for comparing the position of the pixel and generating a selection signal (e.g., low value of 0 or high value of 1) to selection circuitry 312 for selecting either the image pixel or a color of the border region for display, in accordance with one embodiment of the present invention.

One skilled in the art will appreciate that timing circuitry 314 basically provides timing control signals to main image fetching circuitry 302 and offset table decoder 306. Timing circuitry 314 may additionally include the logic and/or circuitry for computing the position of the pixel. Exemplary circuitry for computing the position of the pixel includes an eight bit horizontal counter and an eight bit vertical counter that track the pixel in both the horizontal and vertical directions, respectively. In one embodiment, timing circuitry 314 includes a horizontal counter to track the pixel position along a horizontal direction and a vertical counter to track the pixel position along a vertical direction. It should be appreciated that an image is refreshed on a display from left to right in the horizontal direction and from top to bottom in the vertical direction. To track the pixels, the horizontal counter and the vertical counter are incremented by one when transitioning to a next pixel for display. For example, as a pixel is being output for display along a horizontal line from left to right, horizontal counter, which initially has a one count value, increments by one. Thus, the position of the pixel along the horizontal direction is identified by a count value of two. When transitioning to an adjacent pixel column for display along the same horizontal line, the horizontal counter increments from a count value of two to a count value of three. As such, the position of the adjacent pixel along the same horizontal line is identified by a count value of three. In this way, the horizontal counter keeps track of each pixel along the horizontal direction. Similarly, the vertical counter keeps track of each pixel using the same method described above when transitioning to a next pixel row within an image region. In effect, incrementing the horizontal counter and the vertical counter computes the relative position or X and Y coordinates of the pixels within the image region. Additionally, the counters may not necessarily increment by a value of one, but may increment by any suitable values (e.g., two, three, four, etc.). In another embodiment, timing circuitry 314 may include one counter to track the pixels. Here, as each pixel is being displayed, the counter increments by one. As such, each pixel is identified by a unique count value. As is known to those skilled in the art, a separate calculation is then applied to convert the unique count values to X and Y coordinates of the pixels within the image region. After the position of the pixel is computed, timing circuitry 314 outputs the computed horizontal count (HCount) and the vertical count (VCount) to offset table decoder 306 for use in the above-described comparison operations.

An exemplary circuitry included within offset table decoder 306 for comparing the position of the pixel is an eight bit comparator. In one embodiment, after the position of a pixel that is being outputted for display is computed, offset table decoder 306 fetches a first offset value from memory 304 that corresponds to a line of the pixel. In one embodiment, with a symmetrical border region, offset table decoder 306 may additionally compute a second offset value by subtracting the first offset value from a width or a height of the image region.

Subsequently, offset table decoder 306 compares the position of the pixel with the first offset value and the second offset value. In one embodiment, if the position of the pixel is less than or equal to the first offset value or greater than or equal to the second offset value, then offset table decoder 306 generates a low value signal to selection circuitry 312 to select a color of the border region from border color value register 310, which is configured to store a color value, for display. Else, if the position of the pixel is greater than the first offset value and less than the second offset value, then offset table decoder 306 generates a high value signal to selection circuitry 312 to select an image pixel from memory 304 for display.

Figure 7:
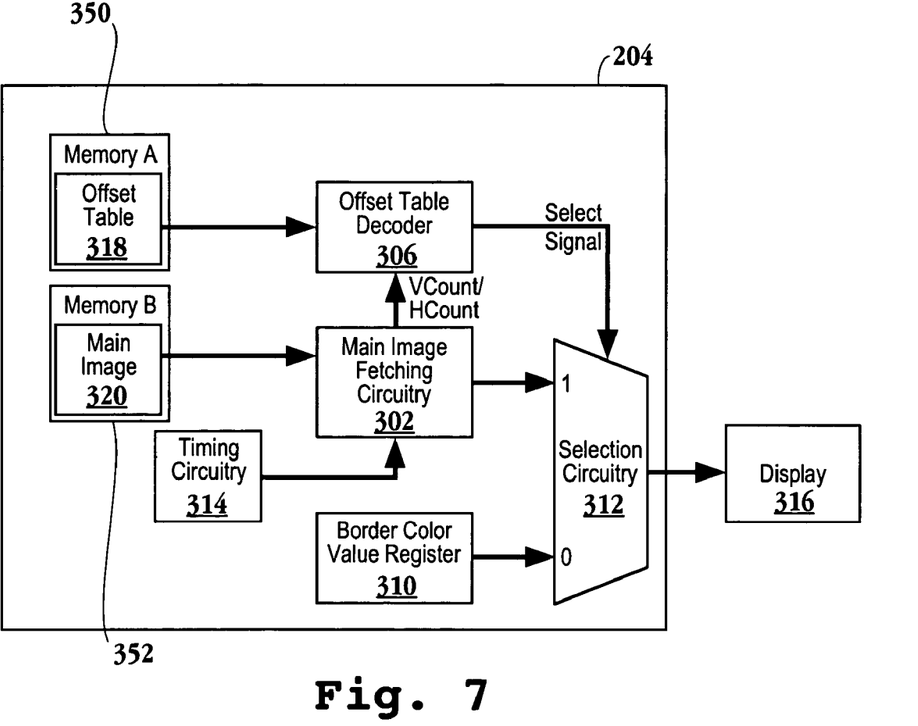
FIG. 7 is another detailed schematic diagram of the display controller shown in FIG. 5, in accordance with one embodiment of the present invention.

FIG. 7 is another detailed schematic diagram of the display controller shown in FIG. 5, in accordance with one embodiment of the present invention. Similar to the display controller shown in FIG. 6, display controller 204 shown in FIG. 7 also includes offset table decoder 306, main image fetching circuitry 302, selection circuitry 312, border color value register 310, and timing circuitry 314. However, instead of one memory, display controller 204 includes two separate memories, namely memory A 350 and memory B 352. Memory A 350 is configured to store offset table 318 and memory B 352 is configured to store main image 320. The separate memories 350, 352 enable the reduction of power consumption. For instance, when offset table decoder 306 retrieves offset values from memory A 350, memory B 352 is not accessed. Accordingly, during the time display controller 204 is displaying a border region, memory B 352 may be temporarily turned off, thereby reducing power consumption.

In summary, the above described invention provides an apparatus, a display controller, and hardware implemented methods to incorporate a border region within an image region. When compared to the conventional method of storing an entire border region, storing the offset values that define the boundaries of the border region reduces memory space. For example, a 10×10 border region requires approximately 132 bits of memory space. However, the above described invention requires merely eight bits of memory space to define the same border region. Memory space may further be reduced if the border region is symmetrical along two axis. For instance, returning to FIG. 2, in addition to being symmetrical along vertical axis 302, border region 102 is also symmetrical with respect to horizontal axis 316. In other words, the top half of border region 102 is a mirror image of the bottom half of the border region with reference to horizontal axis 316. As such, the offset values for the top half of border region 102 may be reused for the bottom half of the border region, but in reverse order. Thus, the top half offset values (10, 4, 3, 2, 1) are sufficient to define border region 102 that is symmetrical along horizontal axis 316 and vertical axis 302. Additionally, the bandwidth required to transmit border region data is reduced because offset values are transmitted instead of all the pixels that define the border region.

Furthermore, as an added advantage, the border region is not actually embedded within the image region because the actual border region is not stored in memory. In other words, the above described invention does not fuse the border region and the image region together to output a combined image. As such, when the image region is printed, the border region is not printed with the image region and therefore, a complete view of the image region without obstruction by the border region may be printed.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A hardware implemented method for incorporating a border region within an image region, comprising method operations of:

using one or more processors for implementing the steps of:

computing a position of a pixel along a line within the image region;

comparing the position of the pixel with a first offset value, the first offset value defining boundaries of the border region along the line; and selecting one of an image pixel or a color of the border region for display based upon the position of the pixel relative to the first offset value; and wherein the method operation of selecting one of the image pixel or the color of the border region includes, selecting the color of the border region for display if the position of the pixel is between a first edge of the image region and the first offset value; and selecting the image pixel for display if the position of the pixel is not between the first edge of the image region and the first offset value.

2. The hardware implemented method of claim 1, further comprising:

computing a second offset value, the second offset value being defined by the first offset value subtracted from one of a width or a height of the image region;

selecting the color of the border region for display if the position of the pixel is between a second edge of the image region and the second offset value, the second edge being opposite to the first edge; and selecting the image pixel for display if the position of the pixel is not between the second edge of the image region and the second offset value.

3. The hardware implemented method of claim 1, wherein the method operation of selecting one of the image pixel or the color of the border region includes, selecting the color of the border region for display if the position of the pixel is less than the first offset value; and selecting the image pixel for display if the position of the pixel is greater than or equal to the first offset value.

4. The hardware implemented method of claim 1, wherein the method operation of selecting one of the image pixel or the color of the border region includes,
  selecting the color of the border region for display if the position of the pixel is greater than a second offset value, the second offset value being defined by the first offset value subtracted from one of a width or a height of the image region; and
  selecting the image pixel for display if the position of the pixel is less than or equal to the second offset value.

5. The hardware implemented method of claim 1, further comprising: repeating each of the method operations for a next pixel along the line.

6. The hardware implemented method of claim 1, further comprising: repeating each of the method operations for a next line.

7. The hardware implemented method of claim 1, wherein the line is defined by one of a horizontal line or a vertical line within the image region.

8. An apparatus for incorporating a border region within an image region, comprising:
  a display controller including,
  circuitry for computing a position of a pixel along a line within the image region,
  circuitry for comparing the position of the pixel with a first offset value and a second offset value, the first and second offset values defining boundaries of the border region along the line, and
  circuitry for generating a first signal for selecting an image pixel from a memory for display if the position of the pixel is between the first and second offset values and generating a second signal for selecting a color of the border region for display if the position of the pixel is outside a region defined between the first and second offset values;
  a central processing unit (CPU) in communication with the display controller; and
  a display panel in communication with the display controller, the display panel enabling the display of the image region.

9. The apparatus of claim 8, wherein the second offset value is the first offset value subtracted from one of a height or a width of the image region.

10. The apparatus of claim 8, further comprising: the memory being in communication with the CPU.

11. The apparatus of claim 8, wherein the display panel is selected from the group consisting of a liquid crystal display (LCD), a random access memory (RAM)-integrated LCD, a thin-film transistor (TFT) display, a RAM-integrated TFT display, a cathode ray tube (CRT) monitor, and a television.

12. The apparatus of claim 8, wherein the circuitry for computing the position of the pixel includes an eight bit horizontal counter or an eight bit vertical counter.

13. The apparatus of claim 8, wherein the circuitry for comparing the position of the pixel is an eight bit comparator.

14. A display controller for incorporating a border region within an image region, comprising:
  an offset table decoder including,
  logic for comparing a position of a pixel with a first offset value, the first offset value defining boundaries of the border region along a line, and
  logic for generating a first signal to select a color of the border region for display if the position of the pixel is less than the first offset value.

15. The display controller of claim 14, further comprising: selection circuitry in communication with the offset table decoder configured to select one of the color of the border region or an image pixel for display.

16. The display controller of claim 15, further comprising: main image fetching circuitry in communication with the selection circuitry and the offset table decoder, the main image fetching circuitry including,
  logic for fetching the image pixel from a memory for display if the position of the pixel is greater than or equal to the first offset value.

17. The display controller of claim 16, further comprising: timing circuitry in communication with the main image fetching circuitry, the timing circuitry including,
  logic for computing the position of the pixel along the line within the image region.

18. The display controller of claim 16, further comprising: the memory being in communication with the offset table decoder and the main image fetching circuitry, the memory being configured to store image pixels and offset values.

19. The display controller of claim 18, wherein the memory is configured to store different color values associated with each line.

20. The display controller of claim 15, wherein the selection circuitry is a multiplexer.

21. The display controller of claim 15, further comprising: a border color value register in communication with the selection circuitry, the border color value register being configured to store a color value of the border region.

22. The display controller of claim 14, wherein the offset table decoder further includes,
  logic for computing a second offset value, the second offset value being defined by the first offset value subtracted from one of a height or a width of the image region; and
  logic for generating a second signal to the selection circuitry to select the color of the border region for display if the position of the pixel is greater than the second offset value.

23. The display controller of claim 22, further comprising: a main image fetching circuitry in communication with a selection circuitry, a memory, and the offset table decoder, the main image fetching circuitry including,
  logic for fetching the image pixel from the memory for display if the position of the pixel is less than or equal to the second offset value.

* * * * *